United States Patent [19]
Mitcham

[11] Patent Number: 5,973,436
[45] Date of Patent: Oct. 26, 1999

[54] ELECTRICAL MACHINE

[75] Inventor: Alan J. Mitcham, Northumberland, United Kingdom

[73] Assignee: Rolls-Royce Power Engineering plc, Newcastle upon Tyne, United Kingdom

[21] Appl. No.: 08/903,357

[22] Filed: Jul. 30, 1997

Related U.S. Application Data

[63] Continuation-in-part of application No. 08/694,091, Aug. 8, 1996, abandoned.

[51] Int. Cl.$^6$ .......................... H02K 21/12; H02K 37/12
[52] U.S. Cl. .......................... 310/266; 310/156; 310/114; 310/112; 310/261
[58] Field of Search .................... 310/268, 156, 310/114, 112, 266, 261

[56] References Cited

U.S. PATENT DOCUMENTS

| | | | |
|---|---|---|---|
| 5,289,072 | 2/1994 | Lange | 310/266 |
| 5,334,898 | 8/1994 | Skybyk | 310/268 |
| 5,365,137 | 11/1994 | Richardson et al. | 310/258 |
| 5,773,910 | 6/1998 | Lange | 310/266 |

FOREIGN PATENT DOCUMENTS

| | | | |
|---|---|---|---|
| 2131603 | 9/1994 | Canada | H02K 21/12 |
| 3927453 | 2/1991 | Germany | H02K 21/00 |
| 41 38 014 | 11/1991 | Germany | |
| 4138014 | 2/1993 | Germany | H02K 21/00 |
| 19507233 | 10/1995 | Germany | H02K 21/02 |
| 4430139 | 2/1996 | Germany | H02K 21/00 |
| WO 95/04399 | 2/1995 | WIPO | |

*Primary Examiner*—Nestor Ramirez
*Assistant Examiner*—Burt Mullins
*Attorney, Agent, or Firm*—W. Warren Taltavull; Farkas & Manelli PLLC

[57] ABSTRACT

An electrical machine has a rotor shaft (12) which carries a plurality of rotor discs (14) for rotation therewith. Each rotor disc (14) has pairs of rotor rims (16) secured thereto. Each rotor rim (16) consists of a single row of alternate magnets (20) and laminated pole pieces (18) and is opposed by a series of stator cores (22) which straddle the rotor rim (16). Armature windings (24) are disposed within the stator cores (22) for operably exciting said stator. The phase relationship between the currents through the armature windings (24) and the orientation of the stator cores (22) or the magnets (20) in opposing rims (16) are such that the effects of electromagnetic coupling, long path fluxes and torque ripple is reduced.

9 Claims, 8 Drawing Sheets

Flux profile with adjacent phases 90° out of phase

Flux profile with adjacent phases 180° out of phase

Phase A

Phase A'

Electrical Phase Relationship

Electrical Phase Relationship

ELECTRICAL MACHINE

This is a continuation-in-part of application Ser. No. 08/694,091 filed Aug. 8, 1996 now abandoned.

The present invention relates to an electrical machine and in particular to a synchronous machine which operates in accordance to transverse flux principles.

A synchronous machine operating in accordance with transverse flux principles consists of an armature winding in the form of a circular coil co-axial with a rotor. The armature winding links the flux generated by permanent magnets mounted on the rim of the rotor by means of a series of stator cores. An advantage of this topology is that the section of the stator cores can be increased so that more flux can be carried without encroaching on the space required by the armature winding.

In previous designs of transverse flux machines the rotor rims carry two side by side rows of permanent magnets separated by an insulating spacer. Two circular stator coils are used and stator cores are incorporated on both the inside and the outside of the rotor so that useful torque is provided at both the inner and outer surfaces of the rotor.

Problems with machines of this design are that they are difficult to assemble as the stator coils are enclosed within the stator cores. The rotor rims are long and lack stiffness and the rotor is subject to deflections as it has little stiffness against radial shock. The radial force on the stator cores as the flux alternates causes radial movement of the stator casing. This zero order stator case vibration is difficult to alleviate without adding thickness to the casing.

The topology of transverse flux motors has recently been improved to address these problems. The improved topology has a rim consisting of a single row of permanent magnets straddled by a series of stator cores. The ends of the stator core are radially displaced to straddle the rotor rim.

a problem with these improved transverse flux motors is that the stator cores belonging to adjacent motor phases are also subject to significant electromagnetic coupling, which degrades the machine performance.

the present invention seeks to provide a transverse flux motor in which the amount of electromagnetic coupling around the circumference of the motor is reduced.

According to the present invention an electrical machine comprises a rotor including a rotor shaft for rotation about an axis and at least one disc extending therefrom for rotation therewith, each rotor disc has at least one pair of circumferential rotor rims secured thereto, the rims in each pair are secured at the same radial location on opposite sides of the rotor disc, each rotor rim consists of a single row of alternate magnets and pole pieces and is opposed by a series of stator cores disposed adjacent and facing the rotor rim, armature windings are disposed within the stator cores for operably exciting said stator, the armature windings for each pair of rotor rims are excited by currents which are in antiphase and the rotor rims magnets or the rotor magnets and the stator cores in each pair are arranged so that the long path fluxes are equal and opposite in each pair of rotor rims.

In one embodiment of the present invention the net long path flux in the machine is et to zero by arranging that opposite magnets in adjacent rims have the same polarity and that the stator cores are suitably slanted with the cores opposing adjacent rims displaced relative to each other by one pole pitch.

In a second embodiment of the present invention the net long path flux is set to zero by arranging that the magnets in each rim are slanted in opposite directions.

The electrical machine may have multiple discs the phase orientation for a pair of rims on one disc being displaced relative to the phase orientation for pairs of rims on the other discs to reduce torque ripple.

In one embodiment of the present invention the electrical machine has three discs, the phase orientation for a the pair of rims on one on the discs being displaced by 120° relative to the phase orientation for the pairs of rims on the other discs to reduce torque ripple.

Multiple pairs of rims may also be provided on each disc at different radial location on the disc. Preferably the phase orientation for pairs of rims on one disc are phase displaced relative to the phase orientation for the other pairs of rims on the same disc to reduce torque ripple.

In a further embodiment of the present invention two pairs of rims are provided on each rotor disc at different radial locations, the phase orientation of the radially outer pair of rims being displaced by 90° relative to the phase orientation of the radially inner pair of rims to reduce torque ripple.

The present invention will now be described with reference to the accompanying drawings in which.

FIGS. 6(*a*) and 6(*b*) show the magnetic flux profiles in a pair of stator cores enclosing stator coils which are respectively 90° and 180° out of phase.

Figure 7:
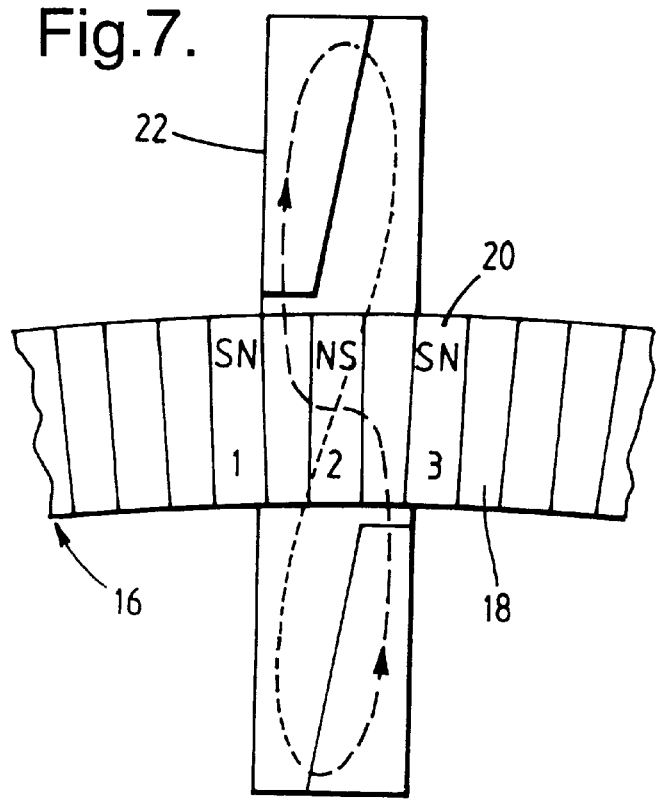

FIG. 7 shows the short path flux through a stator core in accordance with the present invention.

Figure 8:
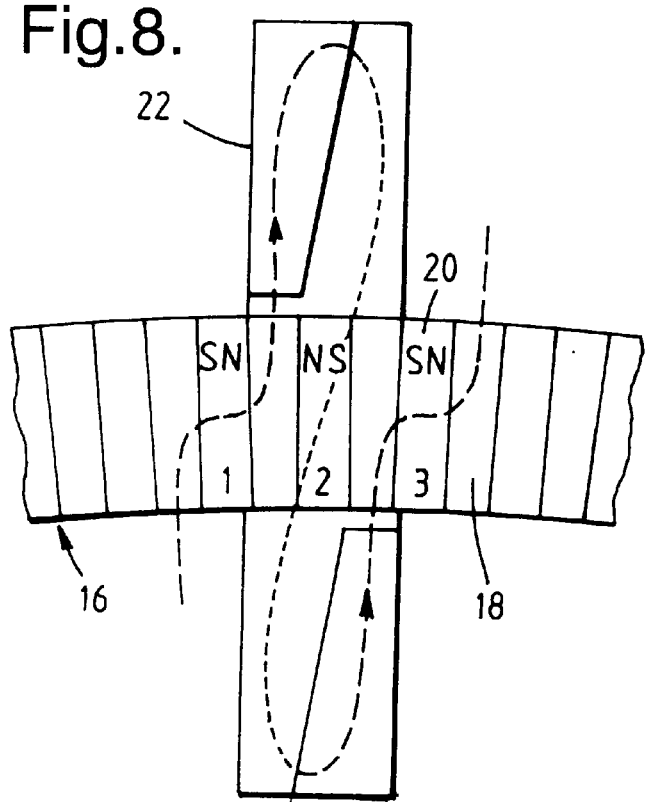

FIG. 8 shows the long path flux through a stator core in accordance with the present invention.

Figure 9:
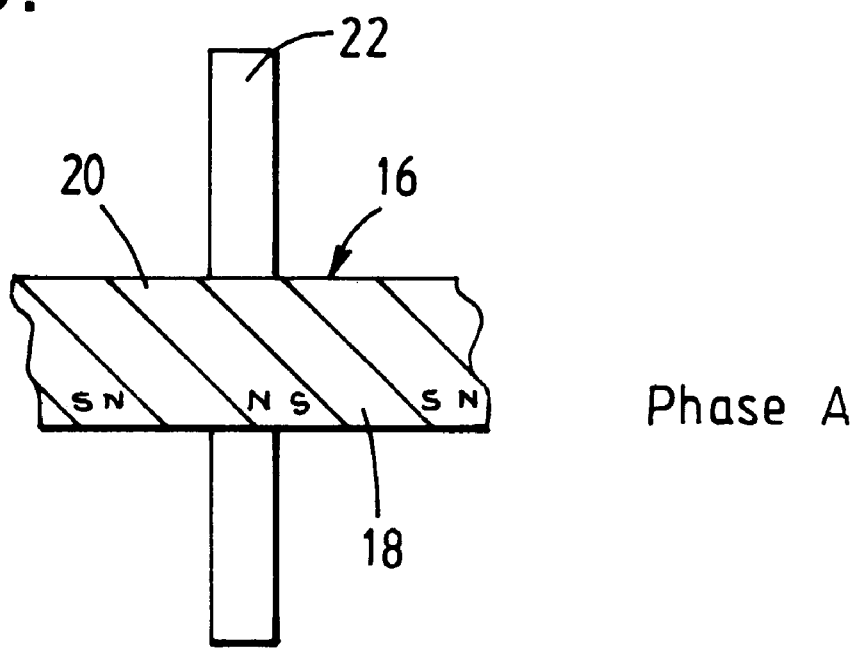
Figure 9:
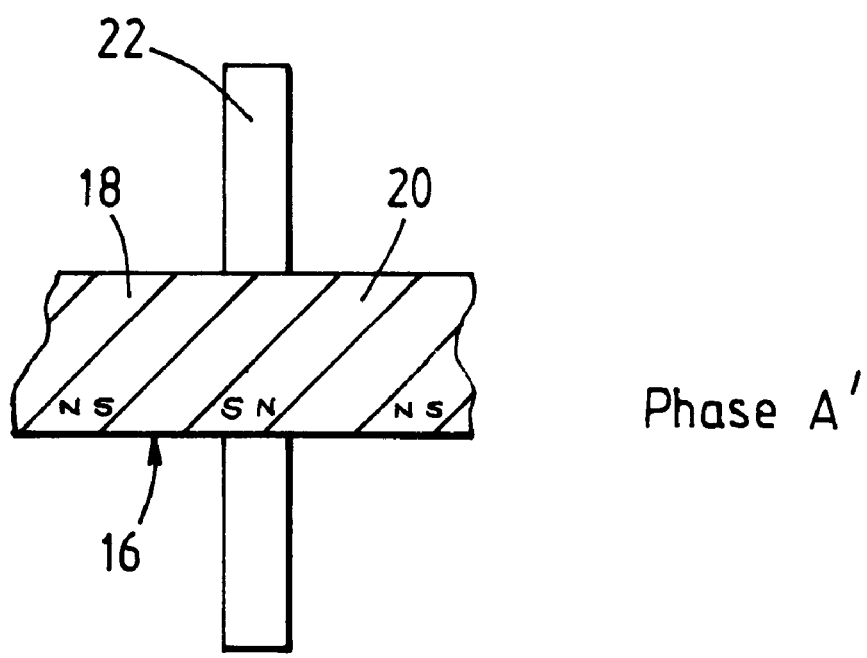

FIG. 9 shows an arrangement in which the magnets in adjacent rims are slanted in opposite directions so that the long path fluxes in these rims are equal and opposite.

FIG. 10(*a*) shows another arrangement in which the long path fluxes in adjacent rims are equal and opposite by arranging opposite magnets in adjacent rims to have the same polarity, the stator cores are suitably slanted and the stator cores on adjacent rims are displaced relative to each other by one pole pitch.

FIG. 10(*b*) is a view along line X—X in FIG. 10(*a*).

Figure 11:
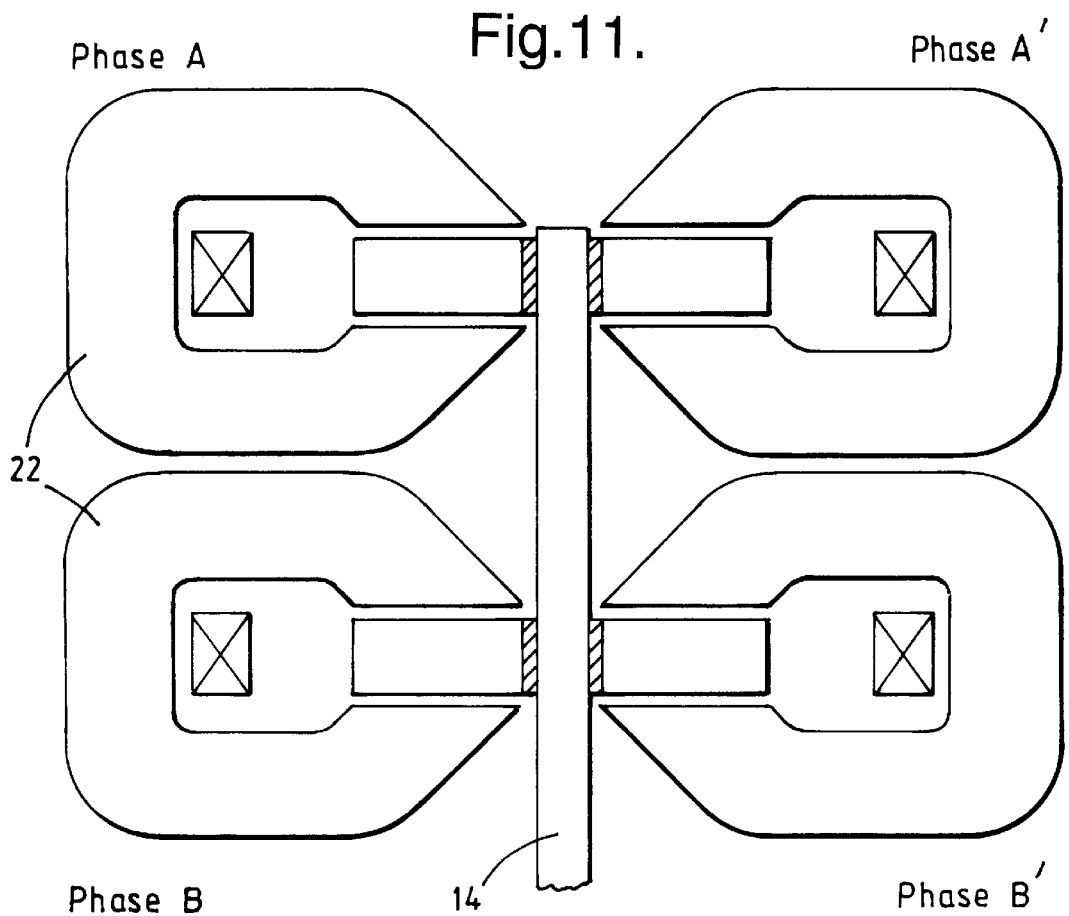

FIG. 11 shows a part of a rotor disc having four phases arranged thereon.

Figure 12:
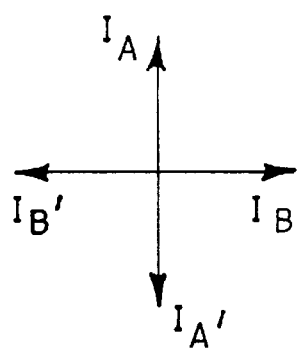

FIG. 12 shows the electrical phase relationship for the arrangement shown in FIG. 11.

Figure 13:
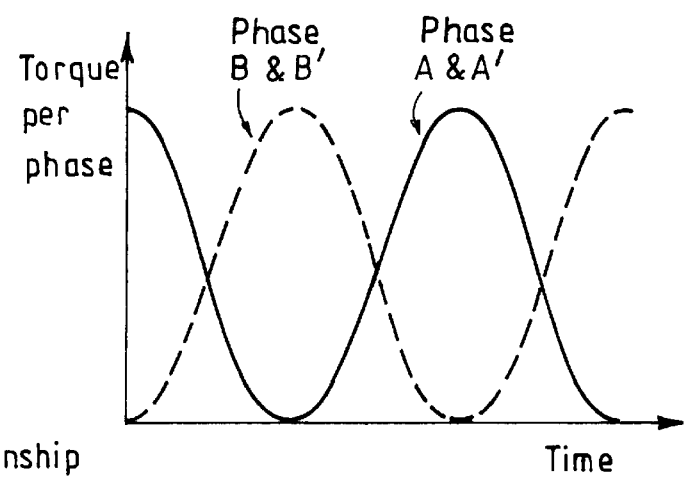

FIG. 13 is a graph of torque versus time for the four phases shown in FIG. 11.

Figure 14:
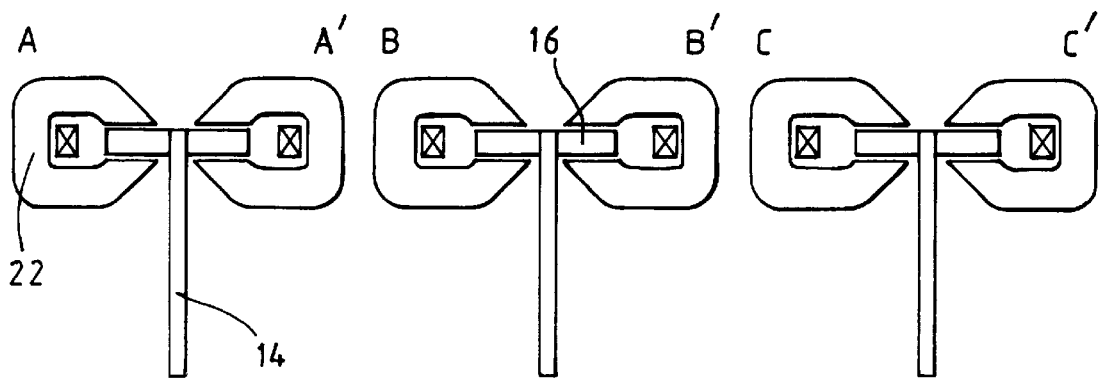

FIG. 14 shows part of a transverse flux motor in which three discs are provided, each disc having a pair of phases arranged thereon.

Figure 15:
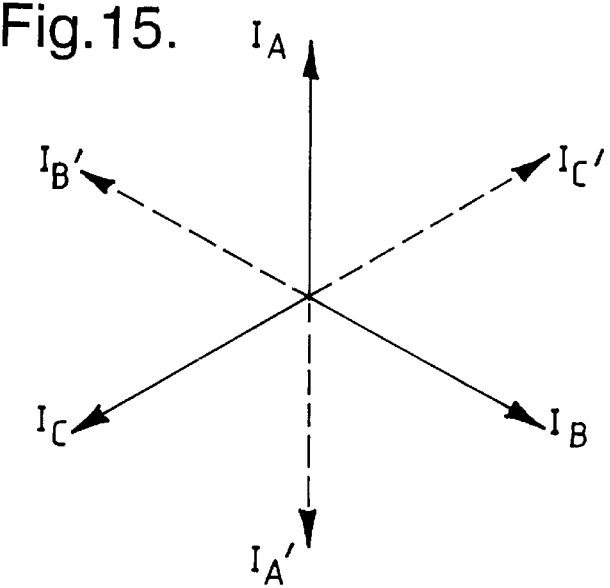

FIG. 15 shows the electrical phase relationship for the arrangement shown in FIG. 14.

Figure 1:
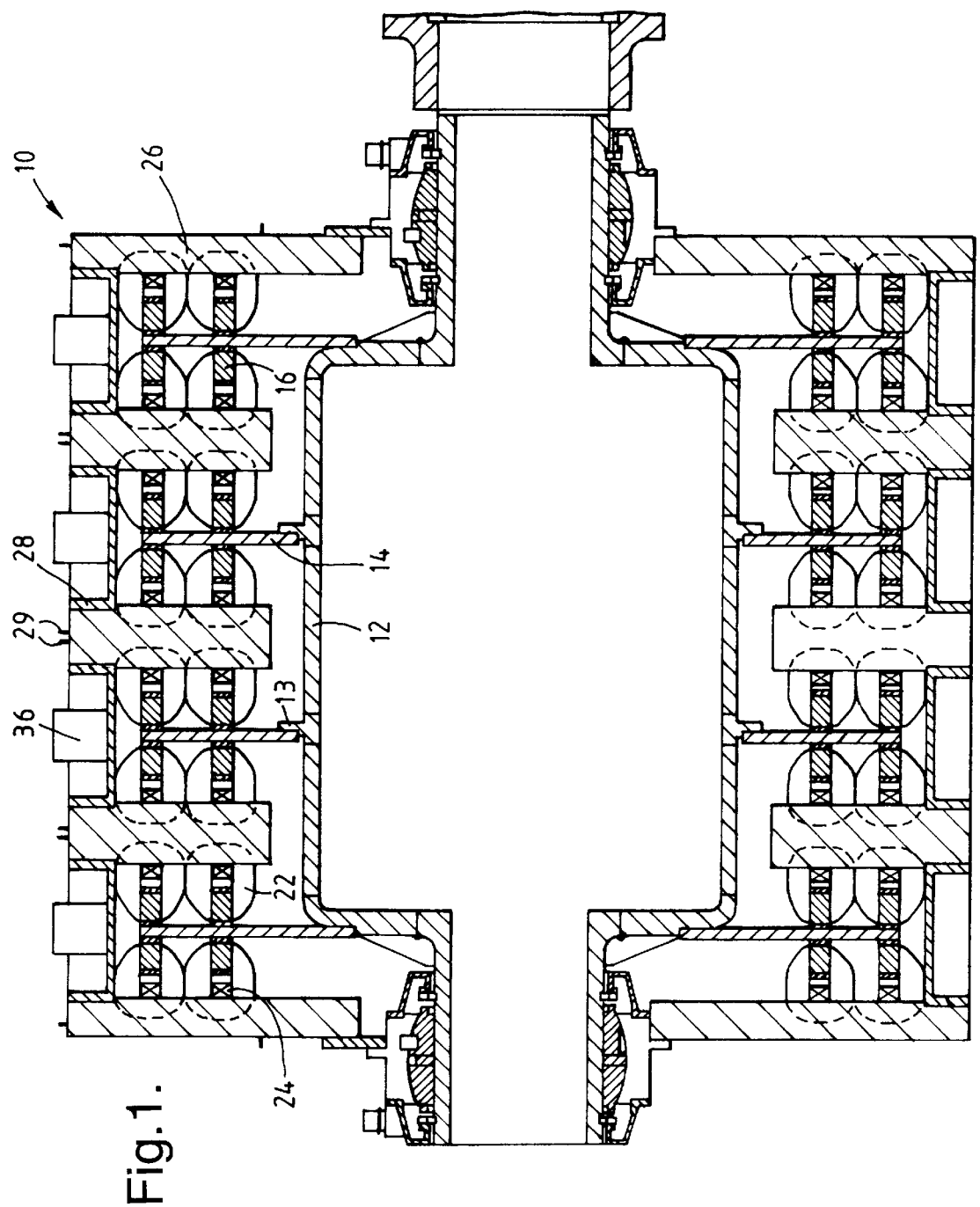
FIG. 1 is a cross-sectional view of a transverse flux motor in accordance with the present invention.

Referring to FIG. 1 a transverse flux motor, generally indicated at 10 comprises a rotor and a stator assembly.

The rotor assembly has four rotor discs 14 bolted to flanges 13 on a hollow shaft 12. Each disc 14 has four circumferential rotor rims 16 which support the active rotor components for four motor phases. The rims 16 consist of single rows of alternate laminated pole pieces 18 and permanent magnets 20.

Suitable magnet materials are the high energy rare earth magnet materials such as samarium cobalt and neodymium iron boron.

Figure 2:
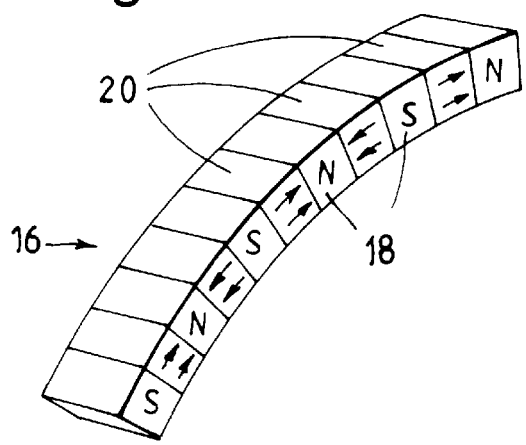
FIG. 2 is an enlarged view of part of one of the rotor rims shown in FIG. 1.

The magnets 20 are orientated in the circumferential direction as shown in FIG. 2 so that the flux from two of the magnets 20 is concentrated into a single pole piece 18. The pole pieces 18 consist of laminations held in compression by bolts (not shown).

Opposing each rotor rim 16 are a series of stator cores 22. A coil 24 is disposed between the stator cores 22 around the rim 16 of the rotor. The coil 24 and stator cores 22 are supported in a stator frame. The stator frame consists of stator discs 26 which are flanged and bolted to a housing 28. The stator cores 22 are located in slots in the stator discs 26. The stator discs 26 are made from aluminum and have a high thermal conductivity to remove heat. A coolant such as water is provided for cooling purposes through the cooling connections 29.

Figure 3:
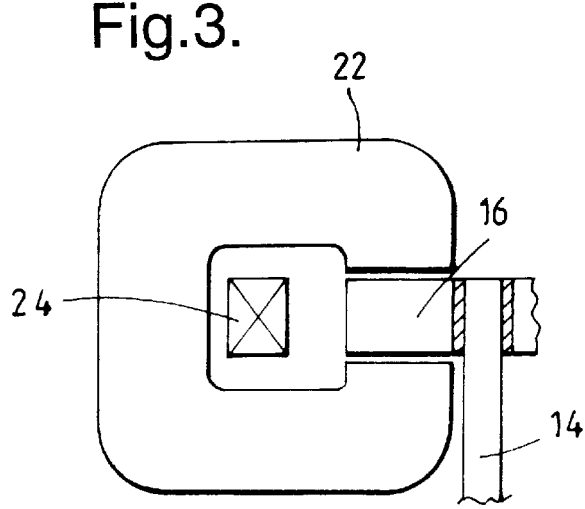
FIG. 3 shows the arrangement of a single motor phase.

The stator cores 22 are C shaped, FIG. 3, and are arranged so that they can receive flux from two adjacent magnets 20 to give the required flux concentration. The stator cores 22 or the magnets 20 on the rotor rim 16 are skewed in such away that each stator core 22 closes around two opposite (north and south) laminated pole pieces 18.

Figure 4:
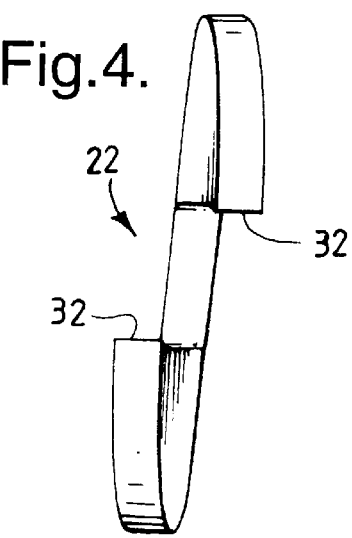
FIGS. 4 and 5 show alternative designs of stator cores for use in a transverse flux motor in accordance with the present invention.
Figure 5:
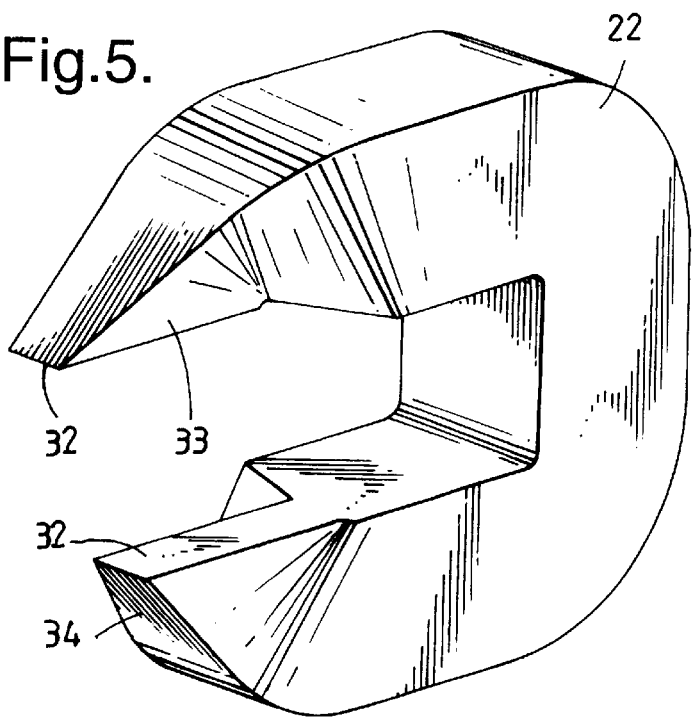

FIGS. 4 and 5 show different stator core 22 designs which have a geometry as described. In the preferred embodiment of the present invention the stator cores are asymmetric, as shown in FIG. 5.

In operation an alternating current passes from terminal boxes 36 mounted on the stator frame 28 through the coils 24 to produce a rotating magnetic field. The rotor rotates as the magnets 20 follow the rotating magnetic filed. The torque generated by each coil 24 is close to sinusoidal and falls to zero as the poles 20 and 32 attract. To give a smooth steady torque multiple phases are required. The multiple phases are provided generally by way of multiple discs and/or multiple phases per disc. The phases are arranged to give complementary torque so that the sinusoidal torque ripple cancels out.

Figure 6A:
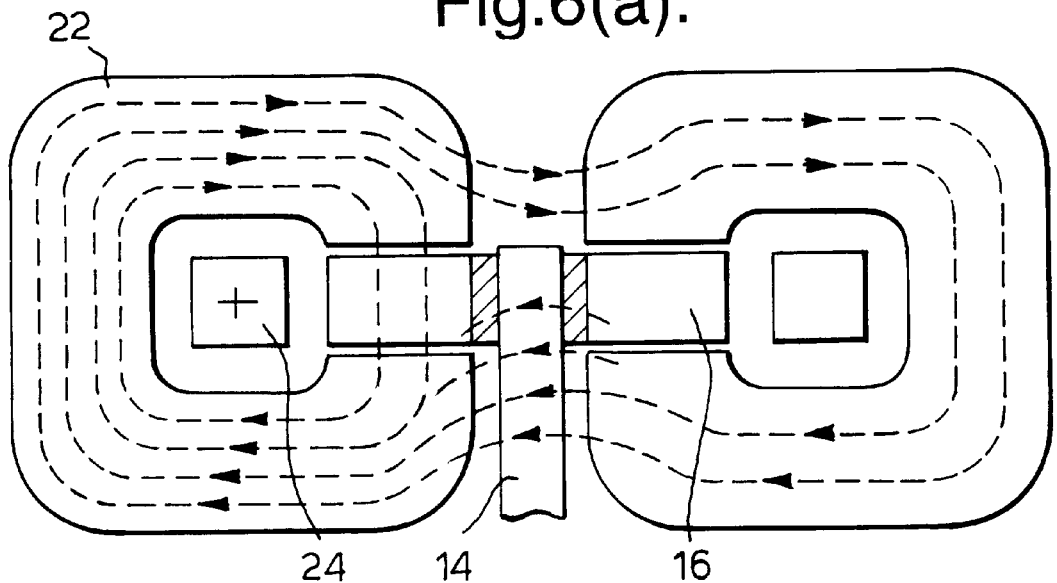
Figure 6B:
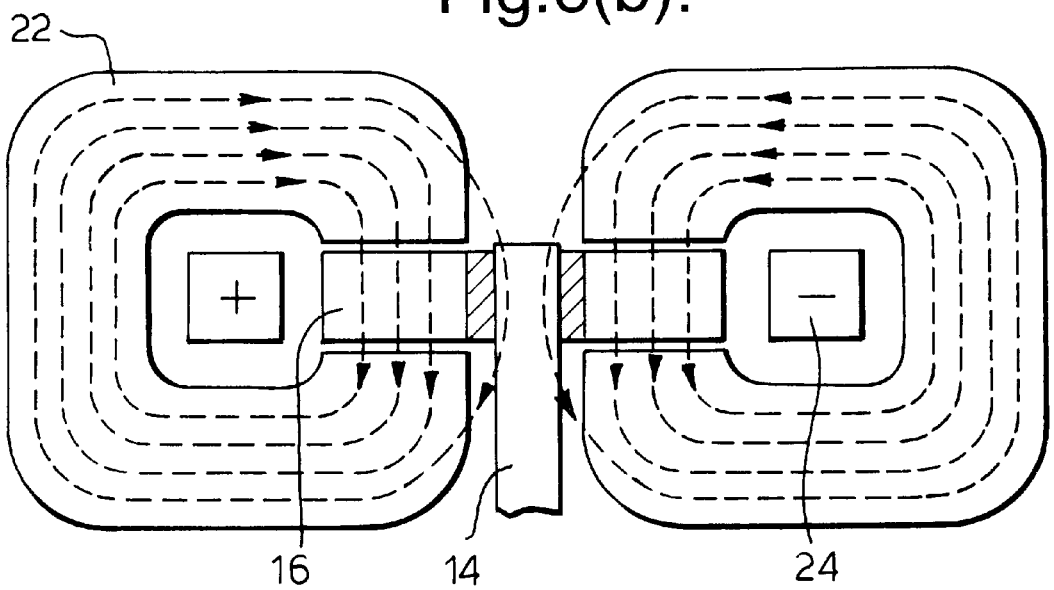

Cancellation of torque ripple means that ideally the phases must be paired so they are complementary to one another. This implies a displacement in the orientation of the phases, ie. the electrical currents and the pole or stator cores are displaced between pairs of rims. To cancel torque ripple the phases should have a separation of 90 degrees. However for a phase separation of 90 electrical degrees there is considerable electromagnetic coupling between the phases as is shown by FIG. 6(a), and the performance of the motor degrades. One consequence of the electromagnetic coupling is that significant eddy currents are generated and pass through the rotor discs 12 and results in high electromagnetic losses.

The electromagnetic coupling can be eliminated and the associated eddy currents reduced if phases on opposite sides of the disc 14 are displaced by 180 electrical degrees (antiphase). this is shown in FIG. (6b).

It is also necessary to ensure that the net circulating long path flux around the machine is zero by arranging that the long path fluxes in adjacent rotor rims are equal and opposite. A net circulating long path flux causes currents which pass through the rotor shaft 12 and the stator frame.

The flux that feeds the upper limb of the stator core 22 consists of the short flux path which is produced by magnet number 2 in FIG. 7 and also the long flux path which is produced by magnet number 1. The funnelling of the flux relies on both magnets 1 and 2 being able to feed the upper limb of the stator core 22. However whilst the short path flux consists of a local flux loop which simply links the armature winding 24 via a single stator core 22 the long flux path links all the odd numbered magnets including magnets 1 and 3 as shown in FIG. 8. The long path flux thus links all the odd numbered magnets including magnets 1 and 3 as shown in FIG. 8. The long path flux thus links all the stator cores 22 and all the odd numbered magnets to form a complete flux loop around the circumference of the rotor. In normal operation the long path flux will alternate around the machine (clockwise and anticlockwise).

Losses due to the circulatory currents are reduced if the long path fluxes on opposite sides of the disc are equal and opposite.

FIG. 9 shows an arrangement in which the long path fluxes are made equal and opposite by arranging each pair of rims 16 so that the magnets 20 in each rim 16 are slanted in opposite directions.

Figure 10A:
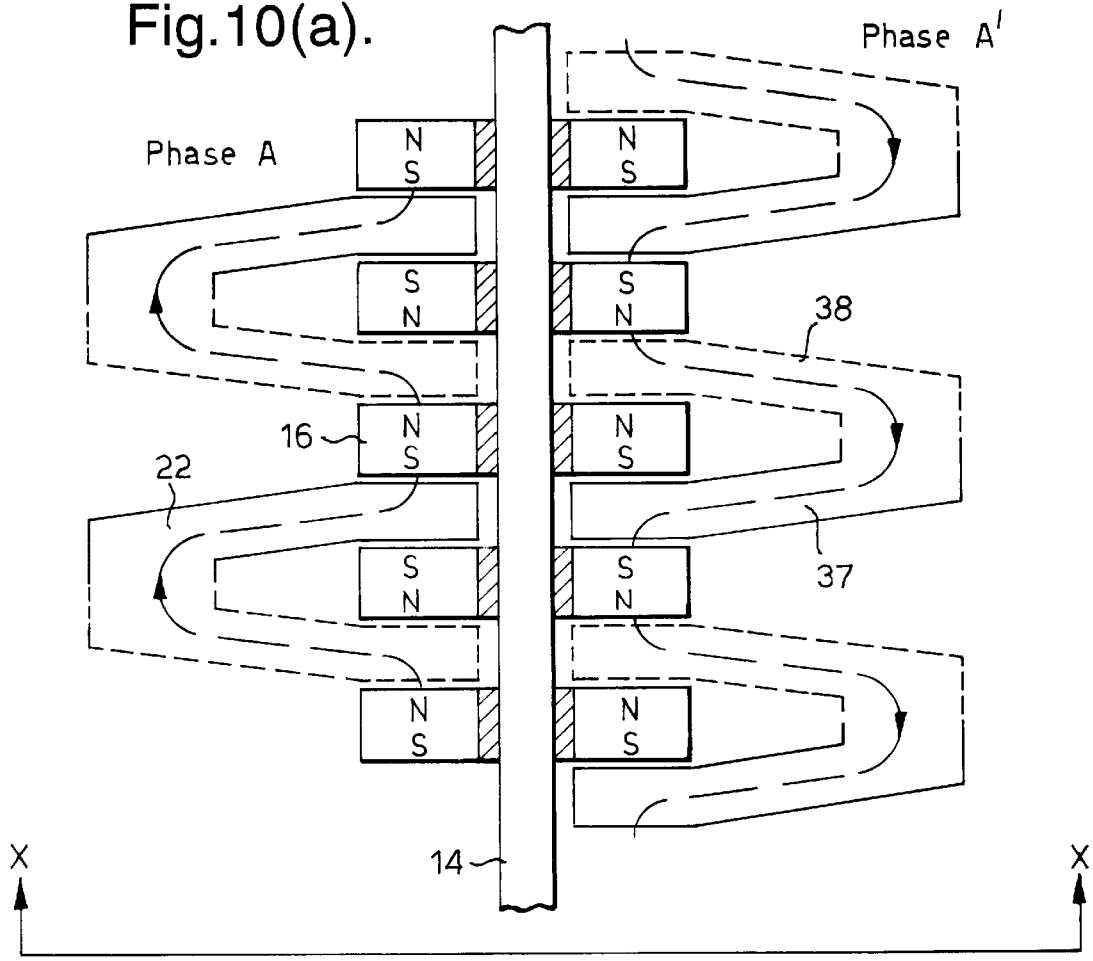
Figure 10B:
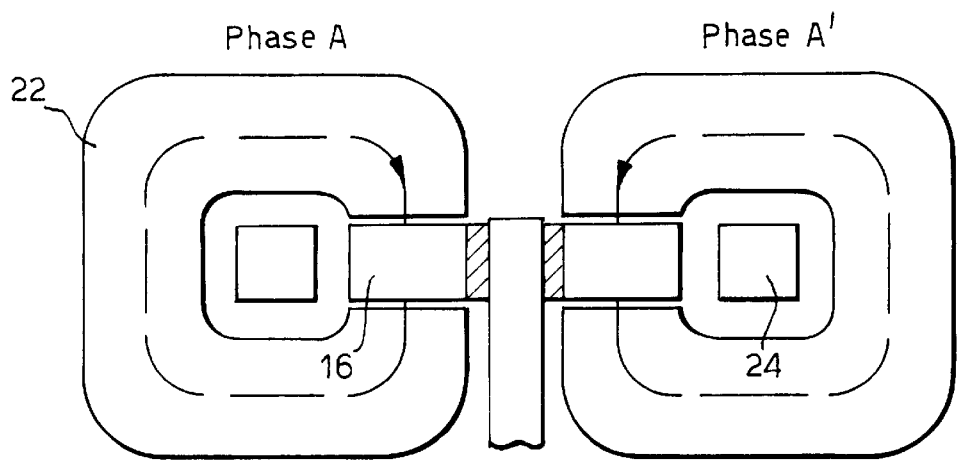

FIGS. 10(a) and 10(b) show schematically an arrangement in which the long path fluxes are made equal and opposite by arranging opposite magnets in adjacent rims to have the same polarity and by arranging the stator cores to be suitably slanted with the cores of adjacent phases being displaced relative to each other by one pole pitch. For reason of clarity, the laminated rotor pole pieces between the magnets are omitted from FIGS. 10(a) and 10(b). The upper parts of the stator cores 37 are shows as solid lines in FIG. 10(a) and the lower parts 38 as broken lines. The directions of the long path flux in the two rims are shown in FIG. 10(a) and it can be seen that they are equal and opposite. The directions of the short path flux are shown in FIG. 10(b) and it can be seen that they are arranged, as in FIG. 6(b) to eliminate coupling between the phases. Furthermore, with the arrangement of the magnets in the two phases as shown in FIG. 10(a), there is no magnet flux which is lost through leakage to the opposite magnet.

FIG. 11 shows an arrangement in which each rotor disc 14 is provided with four phases. The phases in each pair of rims 16 are in antiphase ie. have an electrical phase separation of 180°, to reduce the electromagnetic coupling. The rotor magnets 20 in each pair of rims 16 have reverse polarity to one another and the stator cores 22 are oppositely handed so that the long path flux cancel. The electrical phase relationship for this arrangement is shown in FIG. 12 and the radially inner pair of rims 16 are phase displaced by 90°, with respect to the radially outer pair of rims 16.

From FIG. 13 it can be seen that the torque output die to one phase, say A, is given for an ideal machine by:

$$\Gamma = \Gamma_0 \sin^2\theta = (\Gamma_0/2)(1-\cos 2\theta)$$

where $\Gamma_0$ is a constant and $\theta$ is the electrical angle defined such that 360 electrical degrees represent on electrical cycle of the machine. In a practical machine, however, harmonics are present so that the torque for one phase becomes:

$$\Gamma = \Gamma_0(1+a_2 \cos 2\theta + a_4 \cos 4\theta + a_6 \cos 6\theta + \ldots) \qquad (1)$$

where the coefficients $a_2, a_4, a_6$ generally decrease in magnitude as the order increases. The torque for phases B, A', B' have the same form and with the same magnitudes of the constants $\Gamma_0, a_2, a_4, a_6$ etc but with $\theta$ replaced by $(\theta+90°)$, $(\theta+180°)$ and $(\theta+270°)$ respectively. It can readily by seen that the resultant torque due to all four phases is given by:

$$\Gamma = 4\Gamma_0(1+a_4 \cos 4\theta + a_8 \cos 8\theta + \ldots)$$

Thus the cancellation occurs of all 2n harmonics where n is odd leading to a significant reduction in the overall torque ripple.

The arrangement shown in FIG. 11 achieves a large degree of torque ripple cancellation provided the torque coefficient $\Gamma_0$ is the same for both the inner and outer phases. In practice, the torque produced in each rim is proportional to the square of the diameter; however, by driving the inner phases harder, it is possible to obtain equality of $\Gamma_0$, and hence significant reduction of torque ripple, at torque levels much less than the full load torque. At torque levels close to the full load torque, it is not possible to drive the inner phases sufficiently hard and hence the torque ripple is not complete eliminated since the inner and outer rims 16 provided different full load torque.

However, in a further embodiment of the present invention, in which a multi-disc arrangement it used, torque ripple reduction is also provided by the phase orientation of the different discs 14.

In FIG. 14, the shaft 12 carries three discs 14 each having a single pair of rims 16 at a particular radial location.

The phases on opposite sides of the disc 14 are in antiphase to reduce the electromagnetic coupling and for each pair the stator cores 22 are oppositely handed so that the long path fluxes are equal and opposite. the pair of phases on each disc 14 are phase displaced by 120° relative to the phases on the other discs 14. FIG 14 shows the electrical phase relationship for this arrangement.

The torque due to one phase, say A, is given by the above harmonic series (equation (1)). the torque due to phases C', B, A', C, B' have the same form and with the same magnitudes of coefficients $\Gamma_0, a_2, a_4$, etc but with $\theta$ replaced by (θ+60°), (θ+120°), (θ+180°), (θ+240°), (θ+300°) respectively. It can be readily seen that the resultant torque due to all phases is given by:

$$\Gamma = 6\Gamma_0(1 + a_6 \cos 6\theta + a_{12} \cos 12\theta + \ldots)$$

Hence with this arrangement, a greater degree of harmonic cancellation occurs, leading to a greater reduction in the torque ripple.

It will be appreciated by one skilled in the art that the torque ripple effect can be reduced by having multiple pairs of rims 16 on one disc 14, each pair being phase displaced by an appropriate amount or by phase displacing pairs of rims 16 on adjacent discs 14 by an appropriate amount.

A motor constructed in accordance with the present invention could have any number of discs 14 and/or multiple pairs of rims 16 per disc 14. by using multiple pairs of rims 16 and stator assemblies 22 on either side of each disc 14 the torque available for a given disc diameter is increased.

I claim:

1. An electrical machine comprising a rotor including a rotor shaft for rotation about an axis and at least one disc extending from the rotor shaft for rotation therewith, the rotor disc having at least one pair of circumferential rotor rims secured to the rotor disc, the rims in each pair being secure at the same radial location on opposite sides of the rotor disc, each rotor rim comprising alternate magnets and pole pieces and being opposed by a stator assembly comprising stator cores which are disposed adjacent and facing the rotor rim, armature windings being disposed within the stator cores for operably exciting said stator assembly, the armature windings for a pair of rotor rims at a particular radial location on the disc being excited by electrical currents which are in antiphase, said stator cores providing with said magnets flux paths having either a long or a short length as said rotor moves said rims relative to said stator assembly and where said long flux path is equal and opposite in each rim located on opposite sides of said disc at said same radial location.

2. An electrical machine as claimed in claim 1 in which opposite rotor magnets in adjacent rims have the same polarity, the stator cores being suitably slanted with the cores of adjacent phases being displaced relative to each other by one pole pitch so that the long path fluxes in each pair of rims are equal and opposite.

3. An electrical machine as claimed in claim 1 having multiple discs.

4. An electrical machine as claimed in claim 3 in which the phase orientation for a pair of rims on one disc are displaced relative to the phase orientation for pairs of rims on the other discs to reduce torque ripple.

5. An electrical machine as claimed in claim 4 having three discs the phase orientation for a pair of rims on each disc being phase displaced by 120° relative to the phase orientation for the pairs of rims on the other discs to reduce torque ripple.

6. An electrical machine as claimed in claim 1 in which multiple pairs of rims are provided on each disc at different radial location on the disc.

7. An electrical machine as claimed in claim 6 in which the phase orientation for pairs of rims on each disc are displaced relative to the phase orientation for the other pairs of rims on the same disc to reduce torque ripple.

8. An electrical machine as claimed in claim 7 in which two pairs of rims are provided on each rotor disc at different radial locations, the phase orientation of the radially outer pair of rims being displaced by 90° relative to the phase orientation of the radially inner pair of rims to reduce torque ripple.

9. An electrical machine comprising a rotor including a rotor shaft for rotation about an axis and at least one disc extending from the rotor shaft for rotation therewith, the rotor disc having at least one pair of circumferential rotor rims secured to the rotor disc, the rims in each pair being secured at the same radial location on opposite sides of the rotor disc, each rotor rim comprising alternate magnets and pole pieces and being opposed by a stator assembly comprising stator cores which are disposed adjacent and facing the rotor rim, armature windings being disposed within the stator cores for operably exciting said stator assembly, the armature windings for a pair of rotor rims at a particular radial location on the disc being excited by electrical currents which are in antiphase, said stator cores providing with said magnets flux paths having either a long or a short length as said rotor moves said rims relative to said stator assembly and where said long flux path is equal and opposite in each rim located on opposite sides of said disc at said same radial location, said rotor magnets in each pair of rims being slanted in opposite directions so that the long path fluxes at adjacent rims are equal and opposite.

\* \* \* \* \*